(12) United States Patent
Lee

(10) Patent No.: US 9,878,758 B2
(45) Date of Patent: Jan. 30, 2018

(54) POWER ASSISTED FOLDABLE BICYCLE

(71) Applicant: Chunghsin Lee, Las Vegas, NV (US)

(72) Inventor: Chunghsin Lee, Las Vegas, NV (US)

(73) Assignee: FTR Systems, Inc, Las Vegas, NV (US)

( * ) Notice: Subject to any disclaimer, the term of this patent is extended or adjusted under 35 U.S.C. 154(b) by 0 days.

(21) Appl. No.: 14/999,864

(22) Filed: Jul. 12, 2016

(65) Prior Publication Data

US 2017/0361893 A1    Dec. 21, 2017

Related U.S. Application Data

(63) Continuation-in-part of application No. 14/545,981, filed on Jul. 13, 2015, now Pat. No. 9,708,025.

(60) Provisional application No. 62/123,292, filed on Nov. 13, 2014.

(51) Int. Cl.
| | |
|---|---|
| B62K 15/00 | (2006.01) |
| B62K 11/02 | (2006.01) |
| B62K 21/16 | (2006.01) |
| B62K 23/02 | (2006.01) |

(52) U.S. Cl.
CPC ............ *B62K 15/008* (2013.01); *B62K 11/02* (2013.01); *B62K 21/16* (2013.01); *B62K 23/02* (2013.01); *B62K 2015/001* (2013.01)

(58) Field of Classification Search
CPC .... B62K 15/008; B62K 11/02; B62K 15/006; B62M 6/60; B62M 7/12
USPC ........................................................ 180/208
See application file for complete search history.

(56) References Cited

U.S. PATENT DOCUMENTS

| | | | |
|---|---|---|---|
| 7,249,779 B2* | 7/2007 | Ehrenreich | B62B 7/04 |
| | | | 280/278 |
| 8,205,902 B2* | 6/2012 | Uimonen | B62K 15/008 |
| | | | 280/278 |
| 9,643,680 B2* | 5/2017 | Bang | B62K 3/002 |
| 2009/0115167 A1* | 5/2009 | Chin | B62K 11/10 |
| | | | 280/639 |

(Continued)

FOREIGN PATENT DOCUMENTS

| | | | | |
|---|---|---|---|---|
| DE | 102015105321 A1 * | 10/2016 | .......... | B62K 15/008 |
| EP | 0497510 A1 * | 8/1992 | .......... | B62K 15/006 |
| EP | 2610157 A1 * | 7/2013 | .......... | B62K 15/008 |

*Primary Examiner* — Karen Beck
(74) *Attorney, Agent, or Firm* — Don Halgren

(57) ABSTRACT

A motorized foldable bicycle assembly is foldably collapsible from a ridable elongated, segmented four sectioned frame arrangement. The frame consisting of a front wheel support frame, a front frame, a mid frame and a rear wheel support frame, with a set of electronically controlled motorized front and rear wheels spaced longitudinal alignment, apart one on each end of the four-sectioned elongated frame arrangement. The frame sections are foldable into an unridable configuration wherein the front wheel and a displaced rear wheel are arranged in an aligned, side-by-side adjacent, tandem configuration controllably guided by a steering column supported handlebar motor speed and direction control arrangement. A bicycle-supported tilt sensor actuator is in communication with a control computer and a circuit electronically connected to a bicycle handlebar switch, to permit operator controlled non-riding, self-powered, electric-motor-engaged movement of the tilted, partially foldably collapsed bicycle.

12 Claims, 17 Drawing Sheets

(56) References Cited

U.S. PATENT DOCUMENTS

| | | | |
|---|---|---|---|
| 2011/0024217 A1* | 2/2011 | Sluijter | B62K 11/10 180/208 |
| 2014/0291959 A1* | 10/2014 | Yap | B62K 15/006 280/278 |
| 2017/0021893 A1* | 1/2017 | Granell Peniche | B62K 17/00 |
| 2017/0050696 A1* | 2/2017 | Beresnitzky | B62K 15/00 |

* cited by examiner

Fig K6

POWER ASSISTED FOLDABLE BICYCLE

FIELD OF THE INVENTION

The present invention relates to motorized bicycles and more particularly to a motorized bicycle which is movable by motorized assist while it is in a folded-down configuration, and is a continuation-in-part application of U.S. application Ser. No. 14/545,981, filed on Jul. 13, 2015 which is based upon Provisional Application 62/123,292, filed Nov. 13, 2014 now U.S. Pat. No. 9,708,025, each incorporated herein by reference.

BACKGROUND OF THE INVENTION

Discussion of Prior Art

Bicycles have reducable in size by various means of removing detachable wheels or by folding them in half at mid-frame. Theses bicycles are still large when reduced in size, and are not motorizably movable in their smaller folded configuration.

It is an object of the present invention to provide a foldable motorized bicycle which overcomes the disadvantages of the prior art.

It is an object of the present invention to provide an easily foldable, both heightwise and lengthwise which foldable motorized bicycle which is truly compact and motorizably functional in its folded form.

It is a further object of the present invention to provide a compactly folded motorized bicycle to be self powered and mobile when is being moved from one location to another location while folded.

It is yet a further object of the present invention to provide a compactly folded bicycle to have several speed modes to facilitate its movement in a generally collapsed and folded configuration from one location to another location.

It is yet a still further object of the present invention to enable a compact, generally collapsed and folded motorized bicycle to have self-powered mobility when it is tilted for self-powered movement and walkable control thereof.

BRIEF SUMMARY OF THE PRESENT INVENTION

The foldable motorized bicycle of the present invention has a four-sectioned elongated frame comprising a one-sided rearwheel support frame hingedly attached at a front end thereof to an elongated mid-frame. The rear wheel support frame is attached to the mid-frame by a unique "slide plate" third or rearmost hinge. The elongated mid-frame is attached to an elongated front wheel supporting front frame by a second or mid-frame "slide-plate" hinge.

The elongated front frame is connectively attached to a curvilinear steering column support frame by a first or front slide-plate hinge. The curvilinear steering column forward support frame has an uppermost end with a steering column support bearing therearound. The steering column has a lower end portion which is enclosed within the steering column support bearing. The steering column lower end portion has its lower end secured to a one-sided front wheel support frame. The one sided front wheel support frame rotatably secures a motorized front wheel drive and braking arrangement. The steering column has an upper end with a pair of handlebars pivotably arranged in a handlebar pivot housing. The handlebars have a throttle control and a power assisted guided-walking-arrangement therewith, in communication with a tilt monitor member to enable the bicycle to be partially folded up and walked in a motorized, drive-controlled, guided manner by a person walking therealongside. The generally vertical steering column has a steering column hinge which is angularly arranged with respect to the longitudinal axis of the steering column to permit the upper end of the steering column to be folded about the steering column hinge at an acute angel to be non-parallel when folded downwardly and to the side of the steering column support frame, to fully fold and compactualize the bicycle.

A pair of foot rest plates are arranged on the top of the first frame. The foot rest plates have a longitudinal hinge therebetween so as to permit the pair of foot rest plates to be folded compactly upwardly and arranged parallel and vertically to one another, out of when it is desired to put the motorized foldable bicycle into a collapsed configuration.

The folded configuration with the one-sided rear wheel support frame, the mid frame, the front frame, and the steering column forward support frame, may with a little consideration, constitute the lineage of a capitol "M" when viewed as a plan view, the three frame hinges comprising the "connected" points of the M.

The one-sided rear wheel support frame may be seen as arranged on the right-hand side of the directionally controllable motorized rear wheel. The seat saddle is shown disposed over a battery-enclosing housing arrangement. The housing arrangement also encloses a proper control circuit with the tilt member therein, such tilt member or sensor may be for example, a gyroscopic unit of the like, to enable the partially folded-up and mostly collapsed bicycle to be controllably tilted and controllably walked by a person thereadjacent, under power, by the person manipulating a multifunction control switch on an upraised (not folded downwardly) handlebar. The control switch on the handlebar actuates a drive motor computer control circuit which is in cabled communication with each respective electric drive motor on the front and on the rear wheel upon tilt sensor tilt recognition. The control unit effectuates a now reverse rotation and speed control in the motor empowering the rear wheel to correspond to the speed of motor driven rotation the front wheel, during guided tilted bicycle walking thereof, inasmuch as the rear wheel is in a lateral (side-by side or tandem) location with respect to the front wheel when the multi-sectional frame is in the folded-up "M" configuration.

The steering column holding the pair of handlebars has with a steering column hinge arranged at a slight angle with respect to the longitudinal axis of the steering column. The mid-frame and the front frame are connected by the second or mid-hinge, and the one-sided rearwheel support frame is shown connected to the mid-frame by the third or rear hinge. The first or front hinge is connected to the steering column forward support frame. The foldable motorized bicycle has a kickstand movable downwardly. The saddle or seat is held by a telescoping seat column whose length is adjustable.

The foldable motorized bicycle with the steering column hinge has a pivot axis arranged at an acute angle with respect to the longitudinal axis of the steering column, so as to permit the folding of the steering column downwardly, falling snugly and non-parallel to the lower portion of the steering column, to one side of the bicycle in its fully folded or fully collapsed orientation.

The foldable motorized bicycle has a first or front hinge member and a third or rear hinge member, each with a slidable securement pin engagement plate disposed thereon. The second or mid-frame hinge is displayable on the opposite side of that displayed with the rear and front hinges. The slidable securement pin engagement plate is biased upwardly from the hinge body by a biasing member or spring arrangement therebetween. A plurality of securement pins extend sideways outwardly of the hinge body, as may be seen in U.S. Patent Application Applic. No. 62/125,738, and incorporated herein by reference. A securable cammed hinge release handle is disposed atop an upper edge of the slidable securement pin engagement plate so as to permit engagement or release of the securement pins from within a corresponding number of angled pin engagement slots in the engagement plate. 180° movement of the cammed hinge release handle moves the slidable securement pin engagement plate into or out of secure engagement with those engagement pins, which when disengaged, permits the connected frame portions to be opened and folded into parallel alignment with one another thus forming the characterized "M" configuration of those frame members.

The foldable motorized bicycle has its rear wheel support frame, the mid-frame, the front frame and the steering column support frame folded generally linear and parallel to one another each secured by their respective slide plate hinge. The right one of the handlebars may be swiveled or a pivoted downwardly orientation from its proximal handlebar housing arranged at the upper end of the steering column.

The slide plate hinges representing the first or front hinge and the third or rear hinge may be arranged in a fully opened and planar configuration, connected by their respective hinge pins. A cable pass-through is arranged in each half body portion of each respective slide plate hinge. The cable pass-through enables the drive motor control conduits from the handlebars, the switch thereon, and the respective speed control drive motor control computer, to connectively regulate the speed of rotation and direction of rotation drive motor on the rear wheel and the speed of rotation of the front wheel. Such reverse rotation of the now forwardly aimed rear wheel enables two wheel drive in a guided forward direction of the tilted partially folded bicycle.

The steering column is not folded downwardly when the bicycle is in its semi or generally collapsed, "walking" configuration, to enable one handlebar to be gripped by a person walking alongside and controllably guiding the self-propelled, semi or generally collapsed bicycle into its desired location.

Thus what has been shown is a unique framed construction of a motorized two wheeled bicycle, each wheel being individually motorized and controlled as to rotational speed and rotational direction. The bicycle, in its semi or generally collapsed or folded up configuration, may be walkably directed under its own motorized power by an individual walking alongside, merely by tilting the generally folded-up bicycle slightly fowardly by about 10 to 30 degrees, to actuate a go-signal through a tilt sensor, enabling the holding onto one handlebar and operating its associated now-actuatable walk-switch control thereon.

The invention thus comprises a motorized foldable bicycle assembly arranged to be collapsible from an elongated segmented frame arrangement with a set of electronically controlled motorized front and rear wheels spaced longitudinally apart on the elongated frame arrangement now folded into the "M" configuration with the front wheel and the rear wheel arranged in an aligned, generally folded-up, side-by-side adjacent configuration.

In a fully folded and collapsed configuration, the steering column supported handlebar arrangement is collapsed in a skewed or misaligned downward orientation in a space between the now side-by-side wheels; and wherein the segmented frame arrangement forms and is lockable into the generally "M" shaped configuration in the bicycle's folded and collapsed configuration, with the apexes of the M thereof being comprised of the hinge pins. One rear portion of the frame assembly being slightly curved to accommodate the width reducing features of the folded up bicycle assembly. The steering column preferably has a lockable/unlockable hinge near a mid-point thereof, the hinge having a hinge pin arranged at an acute angle with respect to the longitudinal axis of the steering column, to enable the skewed orientation of the steering column and handlebars in the bicycle's folded and collapsed configuration.

The elongated segmented frame arrangement is defined by a plurality of linear frame portions interconnected by lockable/unlockable control conduit passage facilitating hinges. The handlebar arrangement is attached to the steering column by a handlebar pivot-enabling connection housing. The handlebars are foldable in an upward direction with respect to the steering column when the steering column is folded in its collapsed downward direction. The front wheel is connected to the elongated frame by a one-sided front wheel support frame. The rear wheel is connected to the elongated frame by a one-sided rear wheel support frame. The front wheel support frame and the rear wheel support frame are both arranged on the right side of the foldable bicycle in the bicycle's operable ridable orientation, to minimize width of the bicycle when it is in its folded unridable configuration. The front wheel support frame and the rear wheel support frame are both arranged on the inner side of the foldable bicycle, side-by-side one another in the bicycle's folded, unridable configuration.

The invention thus comprises a motorized foldable bicycle assembly arranged to be foldably collapsible from a ridable elongated, segmented four sectioned frame arrangement consisting of a front wheel support frame, a front frame, a mid frame and a rear wheel support frame, with a set of individually electronically controlled motorized front and rear wheels in spaced-apart longitudinal alignment, one on each end of the four-sectioned elongated frame arrangement, foldable into an unridable, guidably walkable configuration wherein the front wheel and a swingably displaced rear wheel are arranged in an aligned, side-by-side adjacent or tandem configuration controllably guided by a steering column supported handlebar motor speed and direction control arrangement; and a bicycle supported tilt sensor actuator in communication with a control computer and circuit electronically connected to a bicycle handlebar switch, to permit operator controlled non-riding electric-motor-engaged movement of the tilted, partially foldably collapsed bicycle. The tilt sensor actuator is arranged to permitively activate the control computer to controllably drive the front and rear wheels in the forward direction. The tilt sensor activates the control computer to control the front and rear wheels when the bicycle is tilted at an angle of about 10 to 30 degrees from vertical. The control computer actuates the displaced rear wheel to rotate in a reverse direction which corresponding rotation with the front wheel to move the bicycle forward. The handlebar switch is a multi-functional mode control member to engage the motorized wheels in multiple forward speeds. The control computer is in communication with the drive wheels by a conduit cable extending through an array aligned hinge openings in the four sectioned frame arrangement. In an alternative embodiment, he control computer may be in communication with the handlebar switch by a wireless bluetooth communication network arranged therebetween.

The invention also includes a method of transporting a motorized foldable bicycle assembly from an elongated, ridable configuration into a compact, minimized, unridable configuration as a folded up compact assembly, comprising: arranging a set of frame segments in a linear arrangement each connected by a lockable and unlockable hinge connected between adjacent frame segments; connecting a one sided front wheel support frame segment to a motorized front wheel, which one sided front wheel support frame segment has an elongated foldable steering column connected thereto, the foldable steering column having a longitudinal axis with a pair of foldable handle bars each pivotally connected to a handle bar housing at an upper end thereof; connecting a one sided rear wheel support frame segment to a motorized rear wheel; unlocking each lockable/ unlockable hinge between adjacent frame segments and lockably folding those frame segments generally into a "M" shape in planar unridable orientation; pivoting downwardly a first handlebar at the handlebar housing, into close proximity to the elongated steering column; actuating a switch control member on a second upright handlebar to establish and permit an onboard computer to assist walking controlled guidance of the partially folded bicycle; and tilting the bicycle forward to trigger a tilt sensor to actuate manual forward motion in the partially folded bicycle.

The method of transporting a motorized foldable bicycle assembly includes: tilting the bicycle forward by about 10 to about 30 degrees to actuate the tilt sensor permitting guided forward motion. The method of transporting a motorized foldable bicycle includes: instructing the motorized rear wheel to rotate in a reverse rotation by the onboard computer when the rear wheel support is folded 180 degrees forwardly around and into a tandem relationship with the front wheel. The method of transporting a motorized bicycle also includes: folding the right sided rear wheel support frame segment and the right sided front wheel support frame into its unridable configuration; The method of transporting a motorized foldable bicycle assembly, includes: folding only one handlebar downwardly to facilitate operator walking control of the control switch on the remaining upright handlebar.

BRIEF DESCRIPTION OF THE DRAWINGS

The objects and advantages of the present invention will become apparent when viewed in conjunction with the following drawings, in which.

DESCRIPTION OF THE PREFERRED EMBODIMENTS

Figure 1:
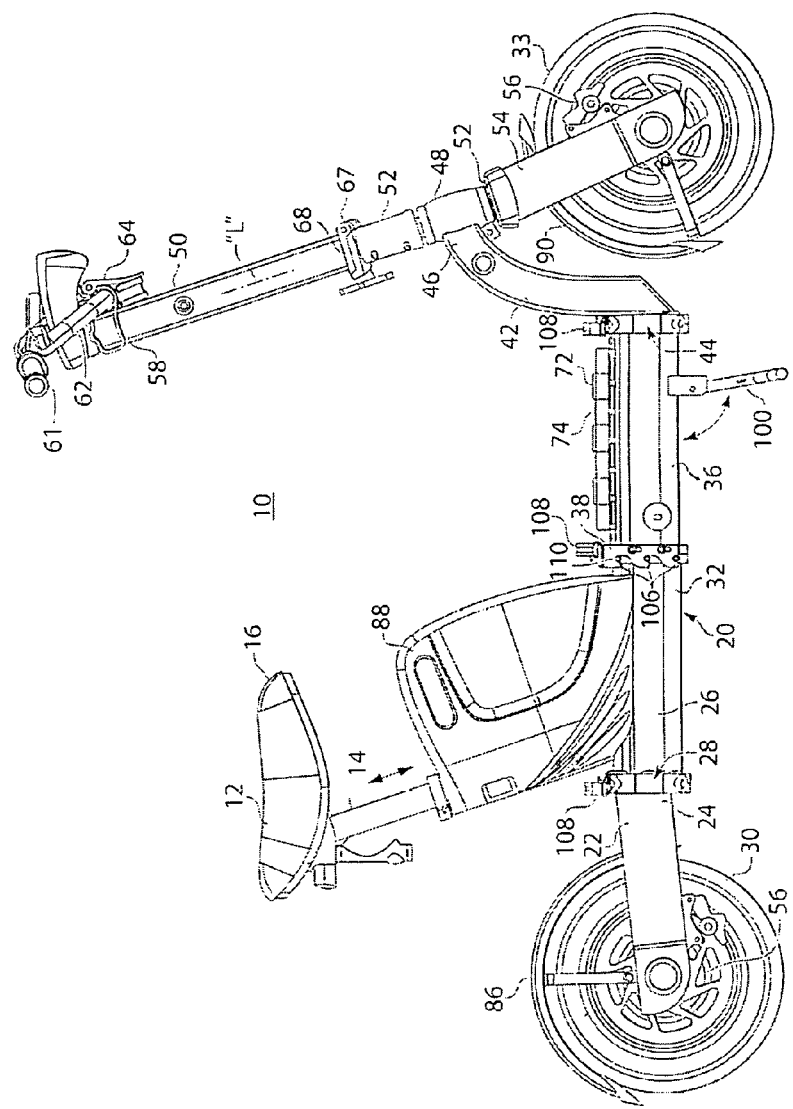
FIG. 1 is a side view (unfolded and ridable) of the right-hand side of the motorized foldable bicycle constructed according to the principles of the present invention.

Referring now to the drawings in detail, and particularly to FIG. 1, there is shown in a right-hand side view a foldable motorized bicycle 10 of the present invention (in its unfolded ridable configuration). For purposes of representation the saddle or seat 12 shown on a telescoping seat column 14 shall have the forward end 16 of the seat 12 directed towards the front end FE of the bicycle 10, particularly appropos when it's described in it's foldable or collapsed configuration, as shown in the following figures and further described hereinbelow.

Figure 6:
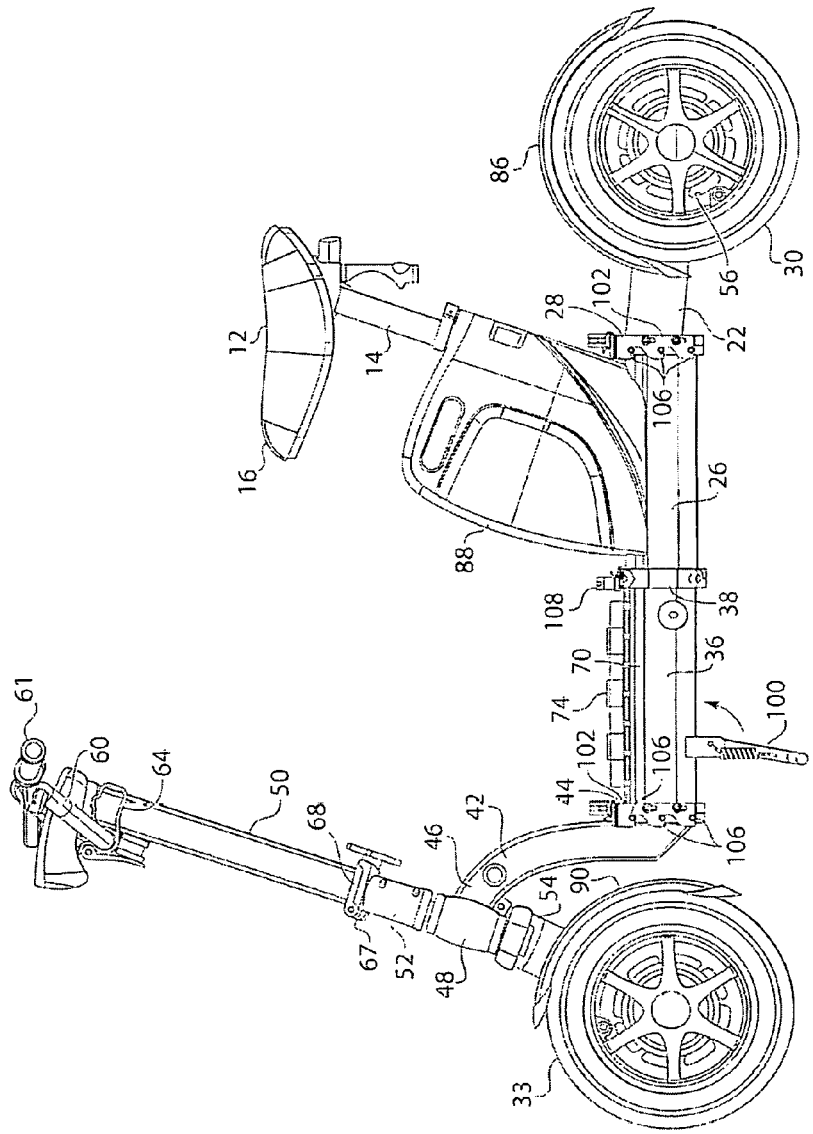
FIG. 6 is a side view of the left-hand side of the motorized foldable bicycle shown in FIG. 1.
Figure 7:
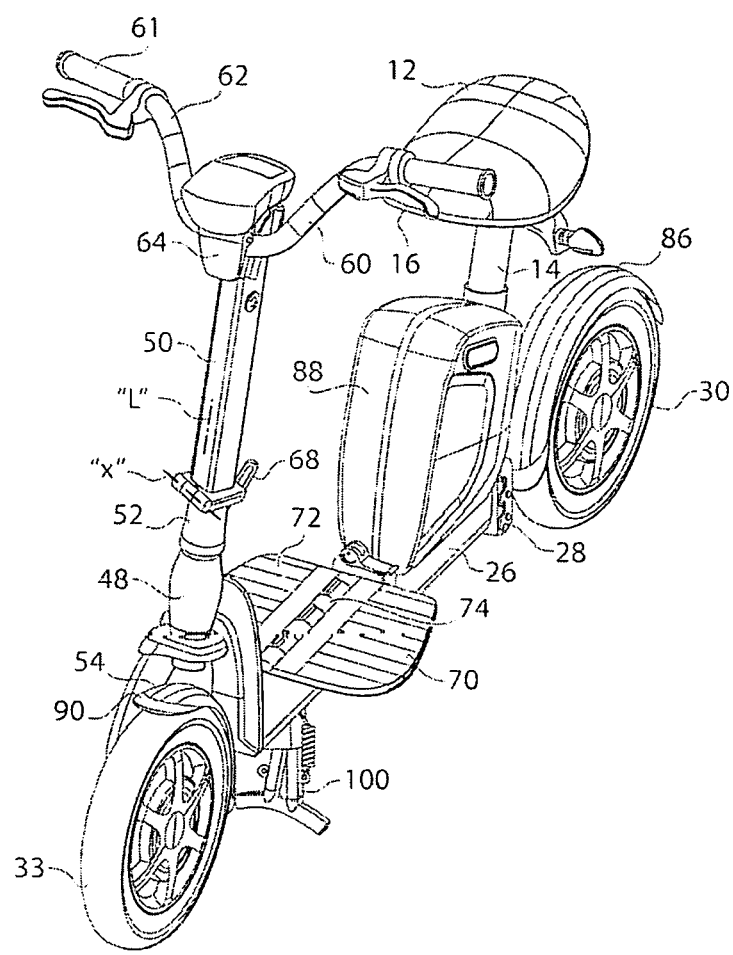
FIG. 7 is a perspective view taken from the front left side of the motorized foldable bicycle shown in FIG. 1.
Figure 8:
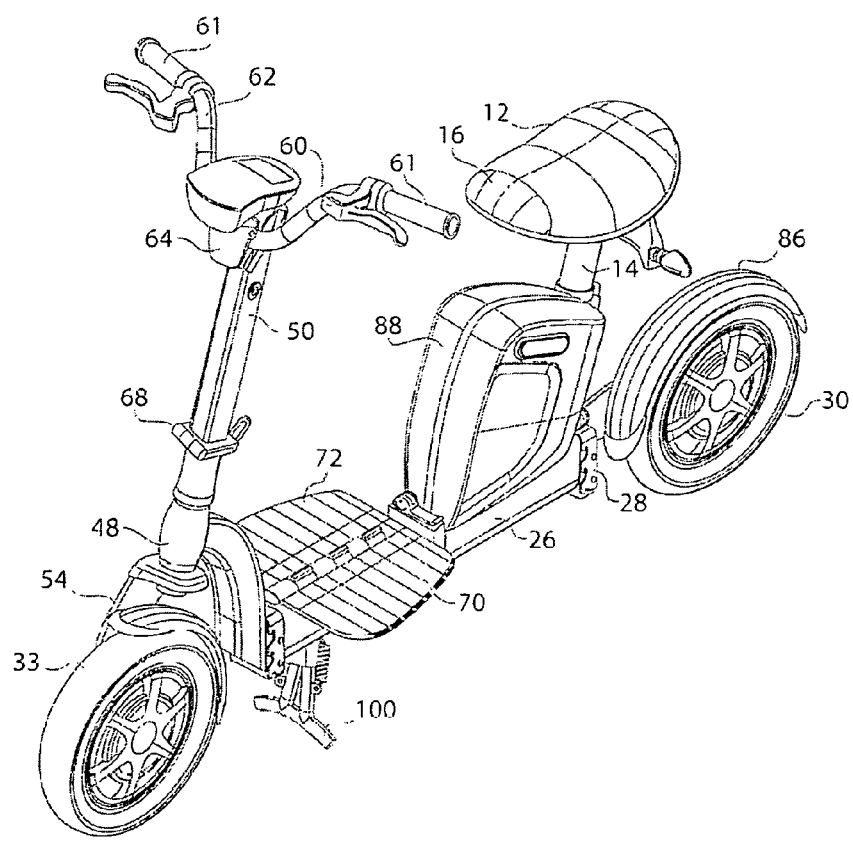
FIG. 8 is a further perspective view taken from the front left side of the motorized foldable bicycle shown in FIG. 1.

The foldable motorized bicycle 10 of the present invention has an elongated hingedly interconnected, multi-linked, multi-foldable, segmented frame 20, best viewed in its open and elongated form in FIGS. 1 and 6, the elongated hingedly lockably and unlockably interconnected, four sectioned, multi-linked, multi-folded frame 20 comprising a bicycle width-reducing one-sided rearwheel support frame 22 hingedly attached at a front end 24 thereof to an elongated mid-frame 26, by a lockable and unlockable hinge 28 arranged therebetween. The rear wheel support frame 22 supports an individually electrically empowered, computer controlled motorized rear drive wheel 30. The rear wheel support frame 22 is attached to the mid-frame 26 by a unique "slide plate" third or rearmost lockable and unlockable multi-finger-engaging torque-minimizing hinge 28. The elongated mid-frame 26 is attached at its front end 32, to an elongated front frame 36 by a second or mid-frame "slide-plate" lockable and unlockable multi-finger-engaging torque-minimizing hinge 38, as may be seen in FIGS. 1 through 3, 6, in a locked configuration and in an open configuration, in FIGS. 9, and 14. The slide plate lockable and unlockable, multi-finger-engaging, torque-minimizing hinges 28 and 38 may be seen more specifically in U.S. Provisional Patent Application No. 62/125,738, filed Jan. 29, 2015 and U.S. Design patent application Ser. No. 29/474, 755, filed Jan. 28, 2015, each incorporated herein by reference in their entirety.

The elongated front frame 36 is connectively attached to an elongated steering column forward support frame 42, of curved shape as shown in FIGS. 1 and 6, (and linear as viewed in FIG. 2) by a first or front slide-plate lockable and unlockable multi-finger-engaging, torque-minimizing hinge 44. The steering column forward support frame 42 has a forwardmost and uppermost end 46 with a steering column support bearing 48 therearound as shown in FIGS. 1, 6, 7, 8 and 9. The steering column 50 has a lower end portion which is enclosed within the steering column support bearing 48 as best seen in FIGS. 1 and 6. The steering column 50 has a lower end 52 which is secured to a bicycle width-reducing one-sided front wheel support frame 54, supporting motorized front wheel 33, as may be seen in FIGS. 1, 5, and 6, and 11. The bicycle width-reducing one-sided front wheel support frame 54 rotatably secures an individually motorized, computer controlled, front wheel drive and braking arrangement 56. The one-sided front wheel support frame 54 and the one-sided rear wheel support frame 22 support their respective wheels 33 and 30 from the right hand side of the bicycle 10, thus enabling the unique folding of the elongated frame 20 while minimizing its width with those front wheel and rear wheel support frames 22 and 54 facing one another when they are in their folded/collapsed orientation as represented, without any wheel support members on the outer side of the folded motorized bicycle 10.

Figure 9:
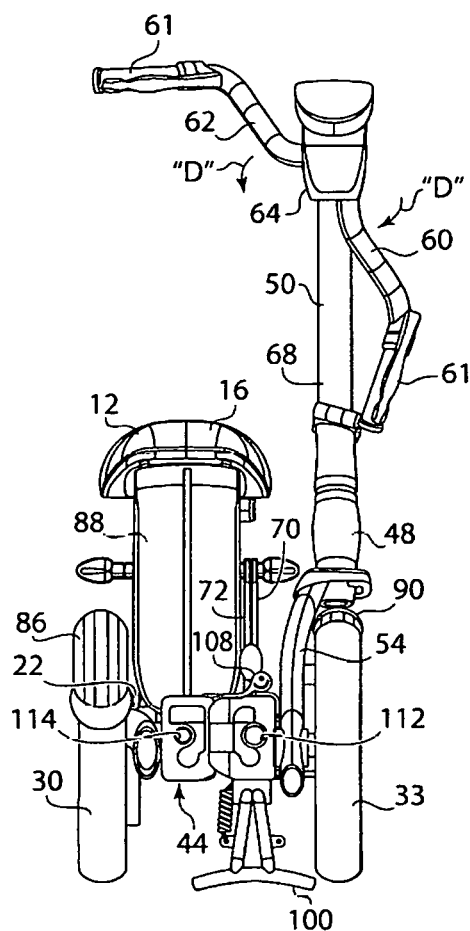
FIG. 9 is a view of the motorized foldable bicycle taken from the front, showing the frame of the bicycle in a partially collapsed configuration.
Figure 10:
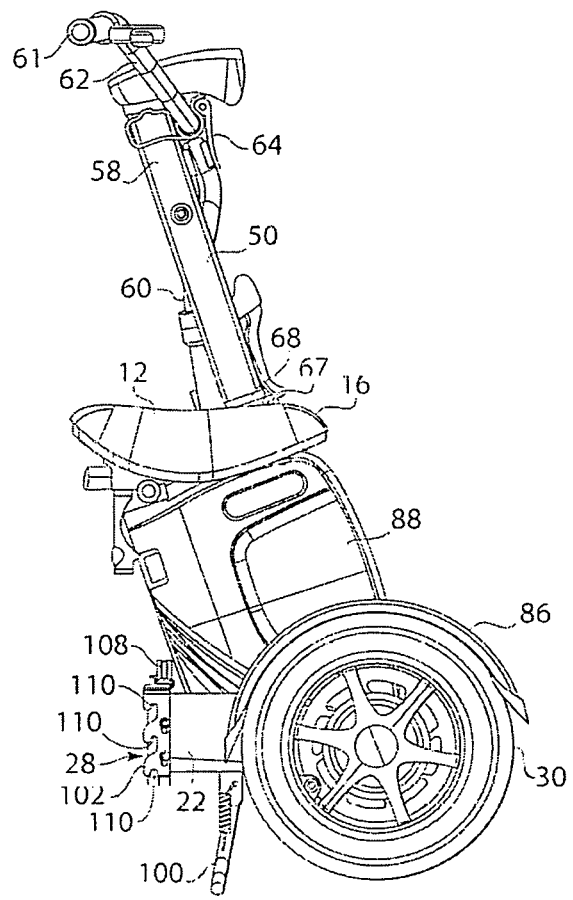
FIG. 10 is a side view of the partially collapsed motorized foldable bicycle shown in FIG. 9.

The steering column 50 has an upper end 58 with a pair of handlebars 60 and 62, with their bicycle hand controls 61 shown distally thereon, each handlebar 60 and 62 may be pivotable downwardly, as represented by arrow "D" in FIG. 9, in a handle lockable handlebar pivot housing 64 as best represented in FIG. 9 and FIGS. 11, 12, 14, 15. The fully collapsed orientation is shown in FIGS. 16-25 in the aforementioned referenced application.

Figure 2:
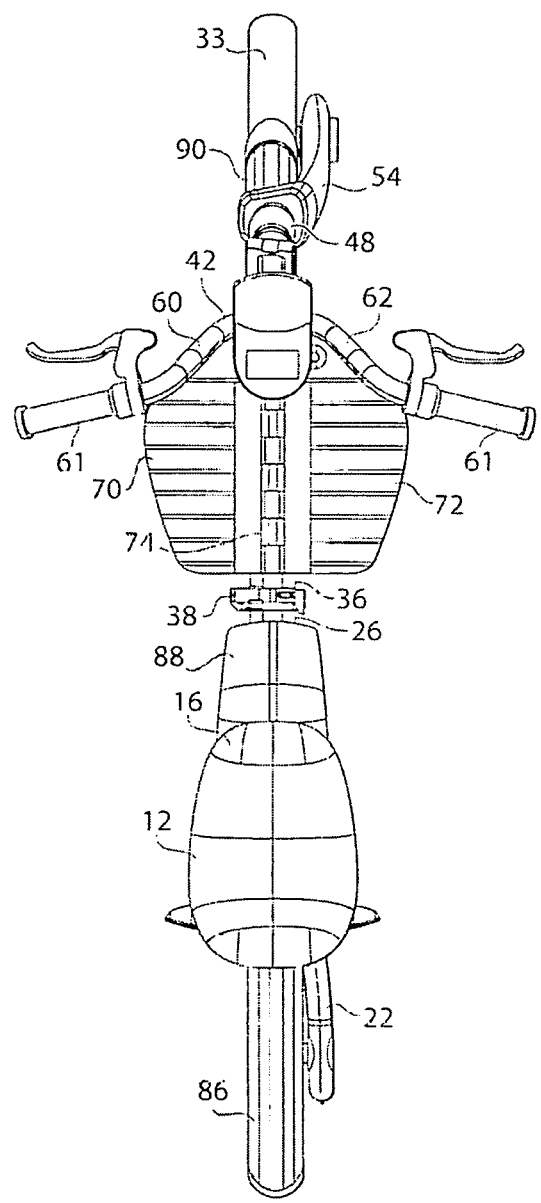
FIG. 2 is a top view of the motorized foldable bicycle shown in FIG. 1.
Figure 3:
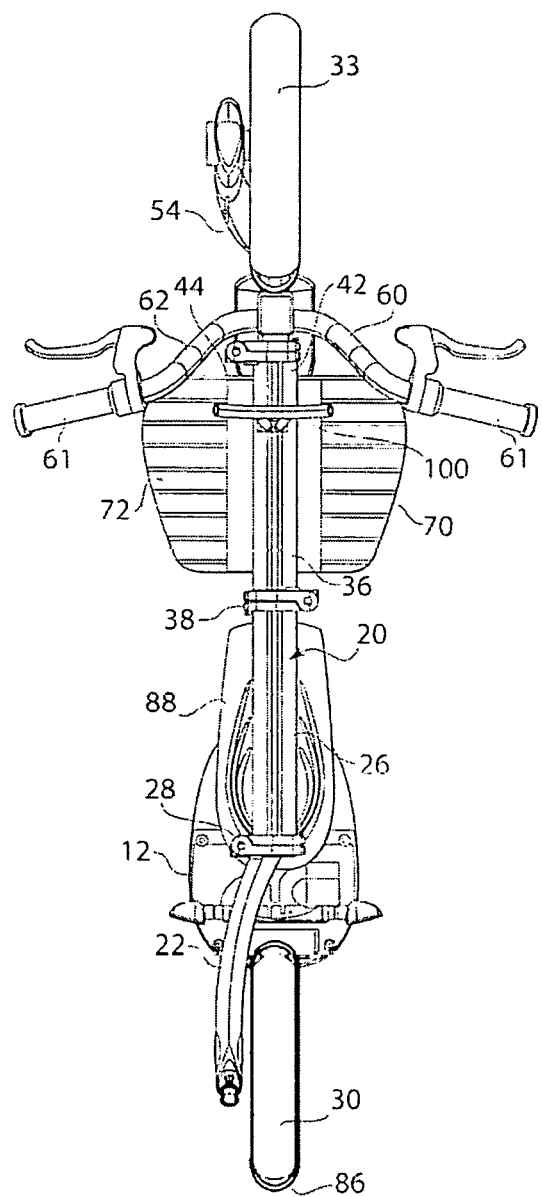
FIG. 3 is a bottom view of the motorized foldable bicycle shown in FIG. 1.

A pair of foot rest plates 70 and 72 are arranged on the top of the first or front frame 36, as seen in an edge view in FIG. 1, and in a plan view in FIG. 2 and in a bottom view in FIG. 3, connected to the top of the front frame 36 with a hinge arrangement 74. The foot rest plates 70 and 72 have the longitudinal hinge 74 therebetween so as to permit the pair of foot rest plates 70 and 72 to both be folded vertically upwardly and parallel and adjacent one another when it is desired to put the motorized foldable bicycle 10 into a collapsed configuration, as may be seen in a stepped series best appreciated as seen in FIG. 8, FIG. 9, FIG. 11, FIG. 14.

FIG. 2 represents a top plan view of the foldable motorized bicycle 10 shown in FIG. 1. The one-sided rearwheel support frame 22 may be seen as arranged on the right-hand side of the rear wheel 30, which is covered by a rear fender 86. The saddle 12 is shown disposed over a battery housing and computer control arrangement 88. The second or mid-frame lockable hinge 38 is shown just rearwardly of the foldable foot rest plates 70 and 72. The one-sided front wheel support frame 54 is shown directed towards the right-hand side of the front wheel 33, partially covered by a front wheel fender 90.

Figure 5:
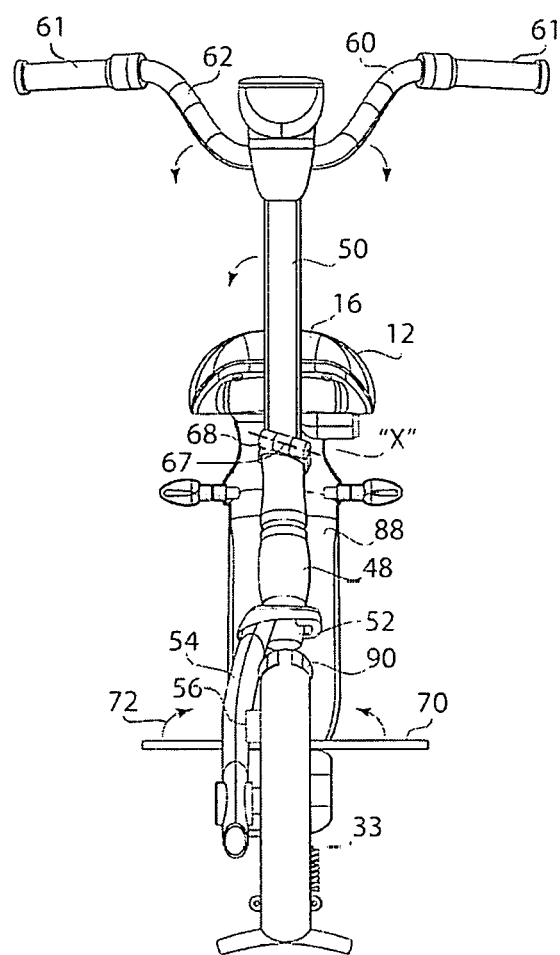
FIG. 5 is a front view of the motorized foldable bicycle shown in FIG. 1.

The steering column 50 holding the pair of handlebars 60 and 62, is shown with a steering column hinge 68 at a slight angle of about 30 degrees with respect to the longitudinal axis "L" of the steering column 50, as may be seen in FIG. 5.

Figure 4:
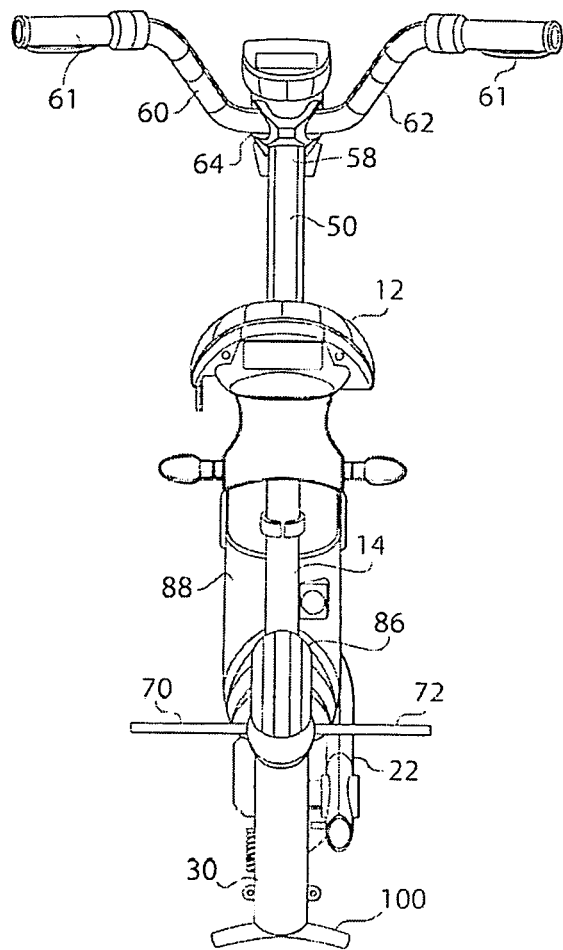
FIG. 4 is a rear view of the motorized foldable bicycle shown in FIG. 1.

A bottom view of the foldable motorized bicycle 10 is shown in FIG. 3 and a plan view of the foldable motorized bicycle 10 is shown in FIG. 2. The mid-frame 20 and the front frame 36 are shown connected by the lockable second or mid-hinge 38 and the one-sided rear wheel support frame 22 is shown connected to the mid-frame 26 by the third or rear lockable hinge 28. One-sided rear wheel support frame 22 and the one sided front wheel support frame 54 each support their electrically empowered wheels 30 and 33 respectively, from the same or right hand side of the bicycle 10 so as to minimize width dimensions thereof when the bicycle 10 is fully folded up. Note also that the first or front lockable hinge 44 is shown in FIG. 3, from the bottom, as connected to the steering column support frame 42. FIG. 4 shows the foldable motorized bicycle from the rear thereof with its kickstand 100 disposed downwardly. The saddle or seat 12 is held by a telescoping seat column 14, whose length is adjustable, is best shown in FIGS. 1 and 6.

Viewing FIG. 5, there is best represented a front view of the foldable motorized bicycle 10 with the steering column lockable/releasable hinge 68 having a hinge pin 67 defining the pivot axis "X" which is arranged at an acute angle of about 60 degrees with respect to the longitudinal axis "L" of the steering column 50, so as to enable the folding of the steering column 50 downwardly and snugly to one side and non-parallel to the lower portion of the steering column 52 of the bicycle 10, when the bicycle 10 is in its collapsed or folded orientation.

The representation shown in FIG. 6 displays the left side view of the foldable motorized bicycle 10 showing the first or front lockable hinge member 44 and the third or rear lockable hinge member 28, each with a slidable securement pin engagement plate 102 disposed thereon. The second or mid-frame lockable hinge 38 is likewise shown in FIG. 6 from the opposite side of that shown of the rear and front lockable hinges 44 and 28 respectively.

As may be seen in FIG. 6, plurality of securement pins 106 extend sideways outwardly of a first pivotable side the body of the lockable hinge 28 and 44, and in lockable hinge 38, shown in FIG. 1. A securable cammed hinge release handle 108 is disposed atop an upper edge of the slidable securement pin engagement plate 102 arranged on the second or other side of the lockable hinge so as to permit engagement or release of the securement pins 106 on the first side of the body of the (each) lockable hinge 28/32/44 from within a corresponding number of angled pin engagement slots 110 on the body of the slidable engagement plate 110 secured to the outer edge of the second side, of the (each) lockable hinges 28/38/44, as may be seen in FIGS. 1 and 6. 180° movement of the cammed hinge release handle 108 moves the slidable securement pin engagement plate 102 into or out of secure engagement with those engagement pins 106, which when disengaged, permits the hingedly connected frame portions to be opened and folded into a common plane, as may be visualized by hinge 44 shown in FIG. 9, and also in folded-open, common-plane-parallel alignment with one another, as represented in FIG. 16, thus enabling the characterized "M" configuration of those bicycle frame members 22, 26, 36 and 42.

Figure 11:
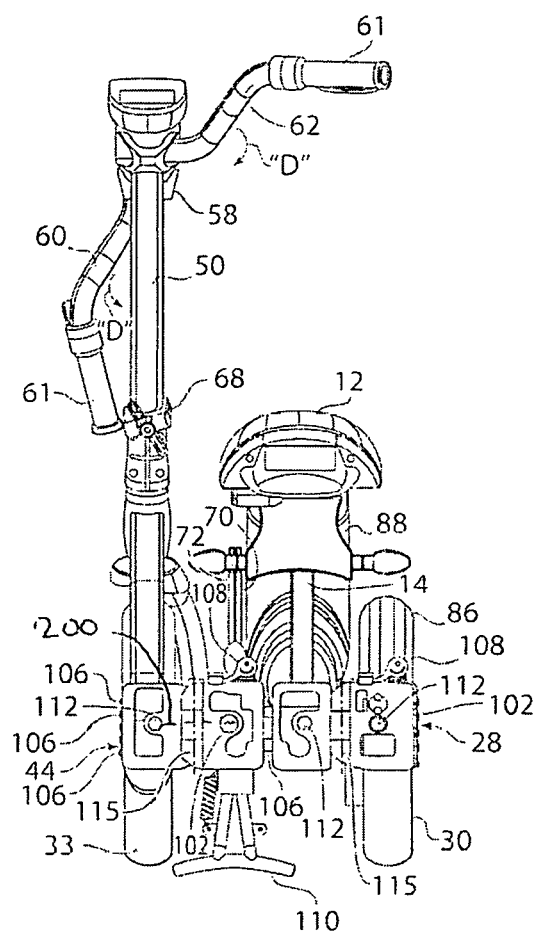
FIG. 11 is a view of the motorized foldable bicycle taken from the front, showing the frame of the bicycle in a partially collapsed configuration.
Figure 12:
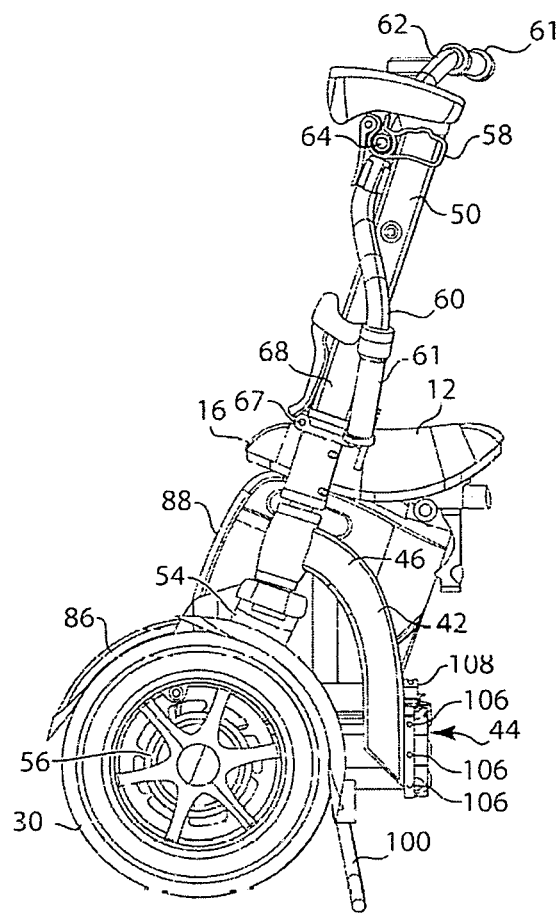
FIG. 12 is a side view of the partially folded or collapsed motorized foldable bicycle as shown in FIG. 11, and which partially folded configuration is suited for the power assisted guided walking of the motorized bicycle.
Figure 13:
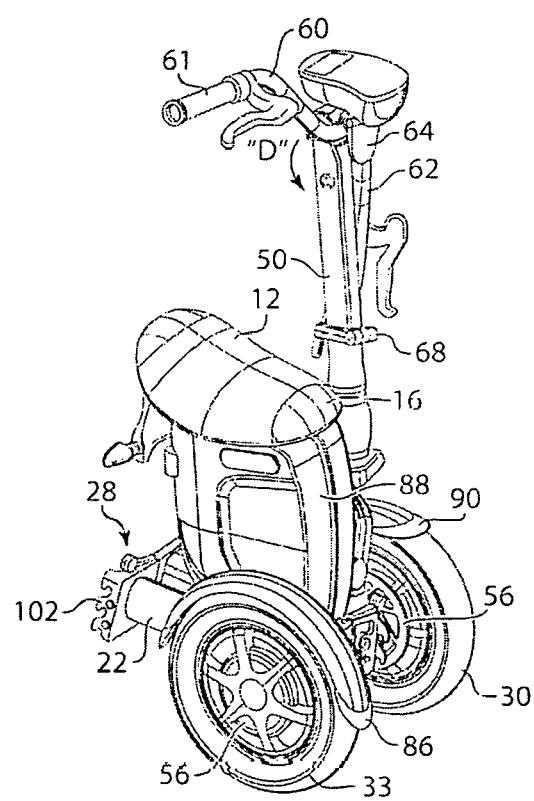
FIG. 13 is a perspective view taken from the left front of the partially folded or collapsed motorized foldable bicycle shown in FIG. 12.

Further, each lockable hinge 28, 36 and 44 have a conduit port 112 and 114 respectively on each side of their body portions of such lockable hinge 28, 36 and 44. Such ports 112 and 114 in each leaf of the hinges enables electrical and control cables to extend therethrough, (not shown for clarity of those figures). The cables 200, shown only partially in FIG. 11, are in electrical communication between a control switch 202 arranged in the hand controls 61 on the right handlebar 62 and the control computer 202 arranged within housing 88. A headlight 208 and display panel 210 are arranged on the upper end of the steering column 50, as may be seen in FIG. 14. The control computer 202 represented in FIG. 15, includes a tilt sensor 204 which senses the operator-induced particular forwardly-directed tilt to establish circuitapproval of the control system, enabling the guided, self-powered walking-assisted movement of the bicycle when it is "partially" folded as represented in FIGS. 11, 12, 13 and 14.

Figure 14:
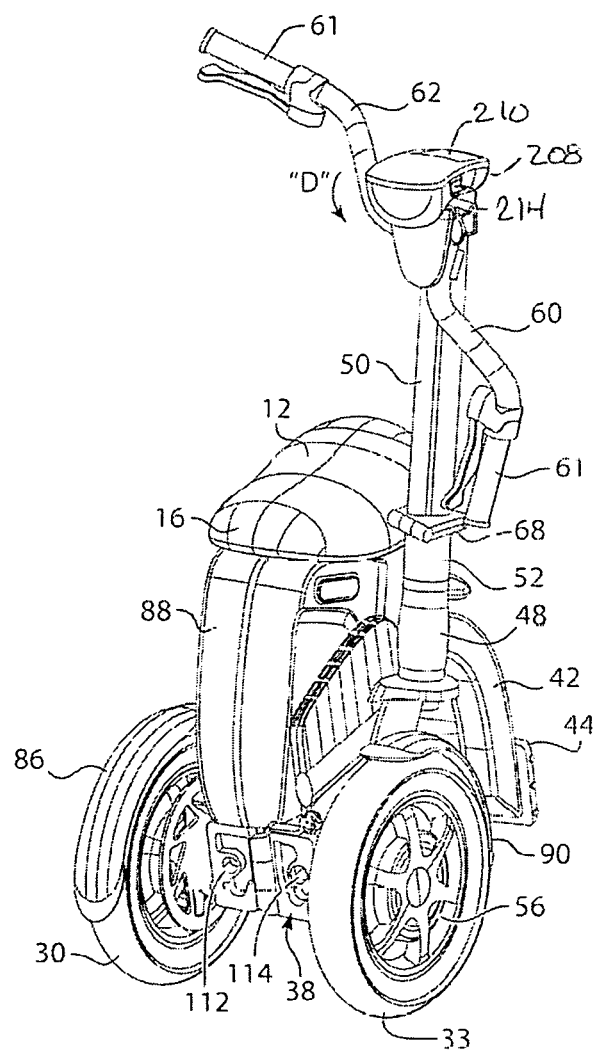
FIG. 14 is a perspective view taken from the right front of the partially folded or collapsed motorized foldable bicycle shown in FIG. 12.

To actuate the waking power assisted function of the bicycle 10 of the present invention, the bicycle 10 is folded into its generally or partially-folded-orientation as shown in FIGS. 11-14, and the frame members 22, 26, 36 and 42 are lockably secured into their folded "M" shape, and the front wheel 33 and the rear wheel 30 are in side-by-side or tandem alignment as may be seen in FIG. 14. Once the power system (battery and motors 54/56) have been shut down, a headlight switch 212 is then turned on by the operator, to establish the control circuit, and the ignition key 214 is then turned on. The display panel 210 shows "Fold" indication that the bicycle 10 is placed in its power assist mode. The system control computer 202 changes the drive motor 56 for the swung-around rear wheel 30 to now run in the reverse direction, as indicated by the arrow "R", in FIG. 17, at the same speed and now the same rotative direction as the drive motor arrangement 56 for the front wheel 33. The control computer 202 permits the power assist walking of the bicycle 10 in a forward direction FD, when the tilt sensor 204 senses a tilt "T" of the bicycle 10 at a forward angle of about 10 to about 30 degrees, as represented in FIG. 17. The walking-assist control switch 202 shown in FIG. 16, has multi-speed functions to engage both the front and the rear motor drive arrangements 56 when the tilt sensor arrangement senses the operator effected 10 to 30 degree forward tilt.

Figure 15:
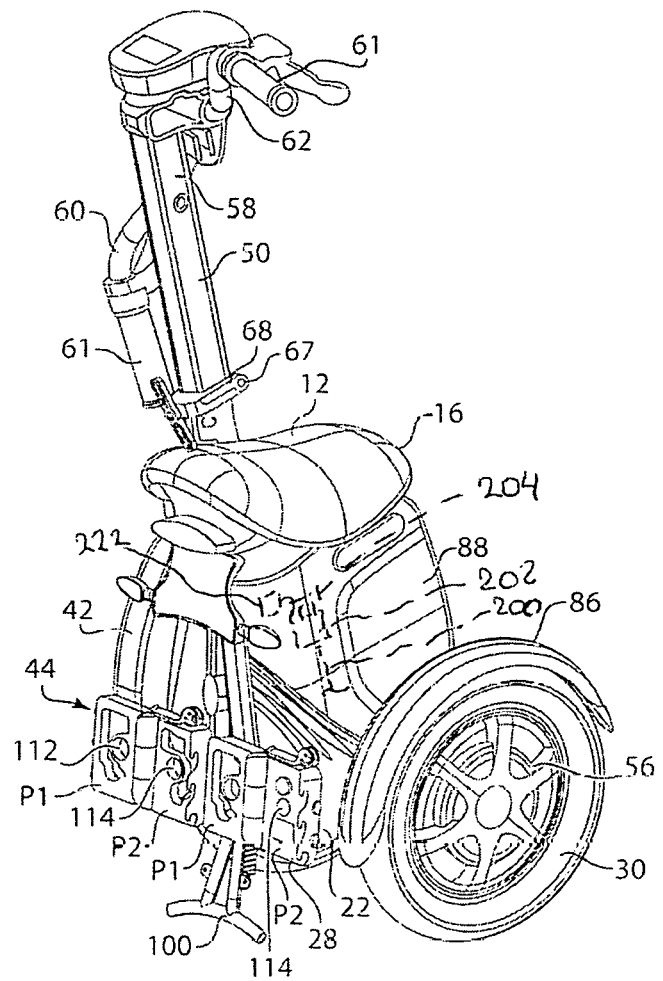
FIG. 15 is a perspective view taken from the left front of the partially folded or collapsed motorized foldable bicycle shown in FIG. 12.
Figure 16:
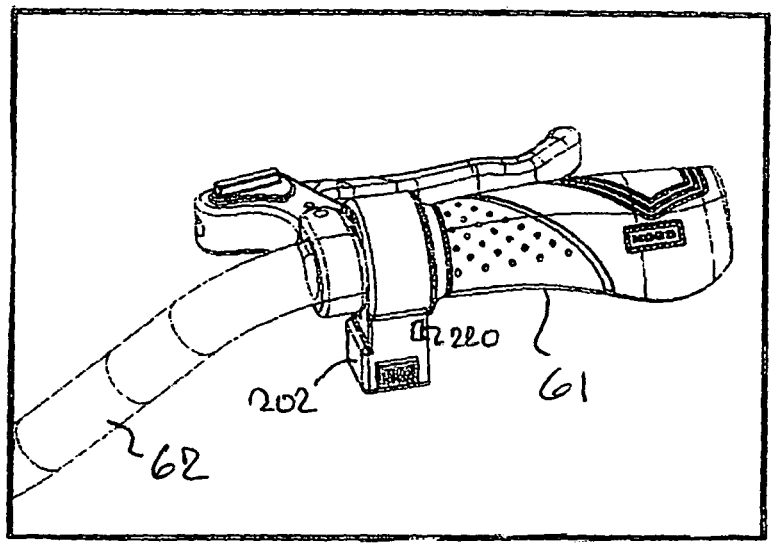
FIG. 16 is a view of the upright (non-folded) handlebar shown in FIG. 12, from the rear of the partially folded or collapsed bicycle.
Figure 17:
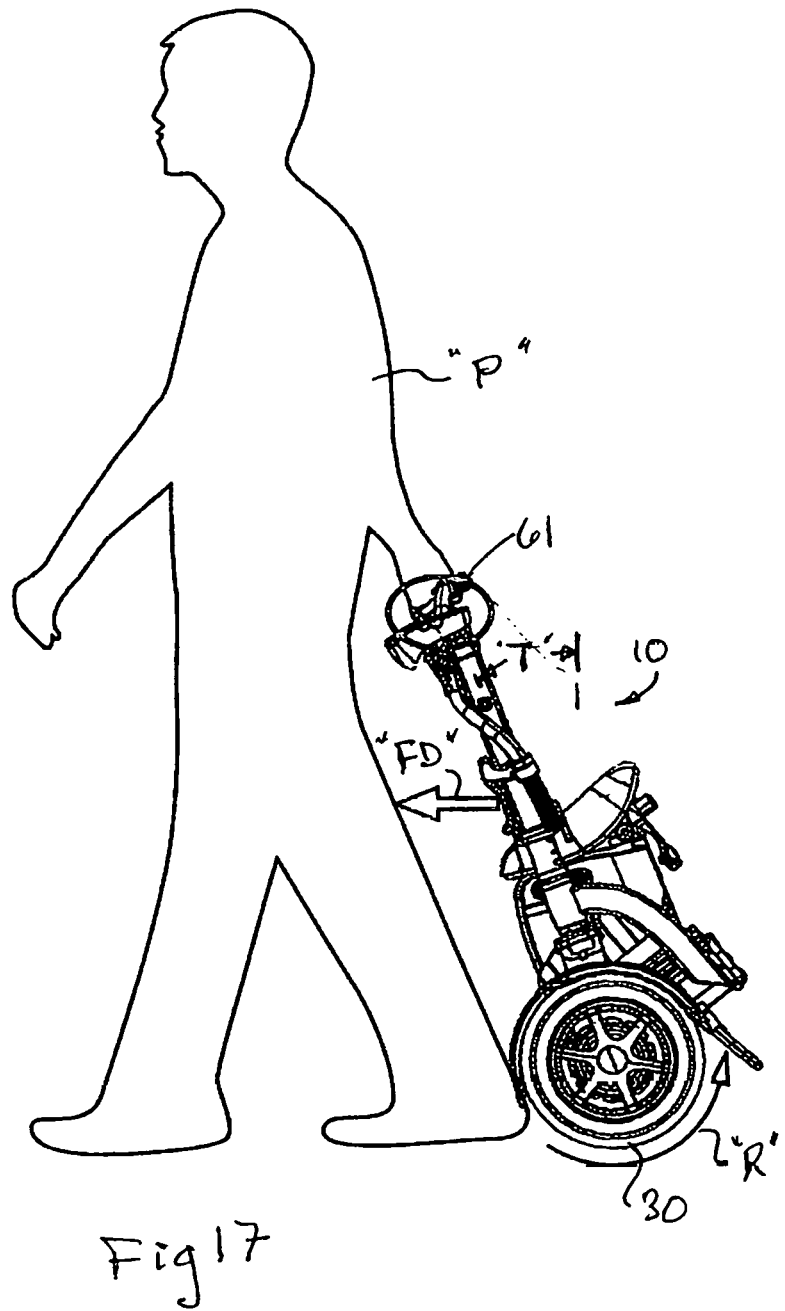
FIG. 17 is a side view of the partially folded bicycle shown in FIG. 12, in a tipped forwardly orientation having guided, controlled motor-assisted movement by a person, shown in outline, walking alongside, holding and manipulating a control switch on the upright control handlebar.

In a further control system embodiment, a wireless blue-tooth signal generator 220 is incorporated into the control switch 202, to wirelessly signal a blue-tooth receiver 222 incorporated into the control computer 202 and its connected tilt sensor 204, as represented in FIGS. 15 and 16. The wireless communication would replace the cable conduit 200 running within the frame members 22, 26, 36 and 42.

Thus what has been shown is a unique framed construction of a motorized two wheeled bicycle 10, each wheel 30 and 33 having controllable/brakable electric motor arrangements 56 wherein such two wheels 30 and 33 are connected by a series of elongated frame members 22, 26, 36 and 42 lockably in a hinged torque-limited controlled arrangement, connected to one another in a linear fashion with a unique lockable/unlockable hinge member 28, 36, 44 respectively, therebetween. Such motorized bicycle 10 being maximally or fully foldable or collapsible by the inclusion of an angularly offset steering column 50 collapse arrangement and one-side-only wheel support frame members 22 and 54.

The bicycle 10 is walkable in a partially folded mode, as represented in FIGS. 11-17, assisted by a tilt-signalled drive arrangement whereby the front and rear wheels are locked into a tandem arrangement, the rear wheel support frame 22 having been swingably folded 180 degrees forwardly about its connective hinge 28, wherein the computer controlled motor drive arrangement 56 for the rear wheel 30 is instructed to rotate so as to be in now-coordinated rotation with the computer controlled motor drive arrangement for the front wheel 33. The power assist is manually controlled by a person "P" controlling a multi-function switch 202 on a handlebar 61 remaining upright while the majority of the bicycle 10 is folded, as represented in FIG. 17.

The invention claimed is:

1. A motorized foldable bicycle assembly arranged to be foldably collapsible from a ridable elongated, segmented four sectioned frame arrangement consisting of a front wheel support frame, a front frame, a mid frame and a rear wheel support frame, with a set of electronically controlled motorized front and rear wheels spaced longitudinal alignment, apart one on each end of the four-sectioned elongated frame arrangement, into an unridable configuration wherein the front wheel and a swingably displaced rear wheel are arrangeable into an aligned, side-by-side adjacent tandem configuration to permit controllable guidance by a manually manipulable steering column supported handlebar motor speed and direction control arrangement; and a bicycle supported tilt sensor actuator in communication with a control computer and circuit electronically connected to a bicycle handlebar switch, to permit operator controlled non-riding self-powered, electric-motor-engaged movement of the tilted, partially foldably collapsed bicycle.

2. The motorized foldable bicycle assembly as recited in claim 1, wherein the tilt sensor actuator is arranged to permit activation of the control computer to controllably drive the front and rear wheels in a forward direction.

3. The motorized foldable bicycle assembly as recited in claim 1, wherein the tilt sensor is arranged to activate the control computer to control the front and rear wheels when the bicycle is tilted at an angle of about 10 to 30 degrees from vertical.

4. The motorized foldable bicycle assembly as recited in claim 1, wherein the displaced rear wheel is effected to rotate in a reverse direction in corresponding rotation with the front wheel to move the bicycle forward.

5. The motorized foldable bicycle assembly as recited in claim 1, wherein the handlebar switch is a multi-functional mode control member to engage the motorized wheels in multiple forward speeds.

6. The motorized foldable bicycle assembly as recited in claim 1, wherein the control computer is in communication with the drive wheels by a conduit cable extending through an array aligned hinge openings in the four sectioned frame arrangement.

7. The motorized foldable bicycle assembly as recited in claim 1, wherein the control computer is in communication with the handlebar switch by a wireless bluetooth communication network arranged therebetween.

8. A method of transporting a motorized foldable bicycle assembly from an elongated, ridable configuration into a compact, minimized, unridable configuration as a folded up compact assembly, comprising:

arranging a set of frame segments in a linear arrangement each connected by a lockable/unlockable hinge connected between adjacent frame segments;

connecting a one sided front wheel support frame segment to a motorized front wheel, which one sided front wheel support frame segment has an elongated foldable steering column connected thereto, the foldable steering column having a longitudinal axis with a pair of foldable handle bars each pivotally connected to a handle bar housing at an upper end thereof;

connecting a one sided rear wheel support frame segment to a motorized rear wheel;

unlocking each lockable/unlockable hinge between adjacent frame segments and folding those linear frame segments folded generally into a "M" shape in planar unridable orientation;

pivoting downwardly a first handlebar at the handlebar housing, into close proximity to the elongated steering column;

actuating a switch control member on a second upright handlebar to establish and permit an onboard computer to assist walking controlled guidance of the partially folded bicycle; and tilting the bicycle forward to trigger a tilt sensor to actuate manual forward motion in the partially folded bicycle.

9. The method of transporting a motorized foldable bicycle assembly as recited in claim 8, including:

tilting the bicycle forward by about 10 to about 30 degrees to actuate the tilt sensor permitting guided forward motion.

10. The method of transporting a motorized foldable bicycle assembly as recited in claim 8, including:

instructing the motorized rear wheel to rotate in a reverse rotation by the onboard computer when the rear wheel support is folded 180 degrees around and into a tandem relationship with the front wheel.

11. The method of transporting a motorized foldable bicycle assembly as recited in claim 8, including:

folding the right sided rear wheel support frame segment and the right sided front wheel support frame into its unridable configuration.

12. The method of transporting a motorized foldable bicycle assembly as recited in claim 8, including:

folding only one handlebar downwardly to facilitate operator walking control of the control switch on the remaining upright handlebar.

\* \* \* \* \*